US007734614B2

(12) United States Patent
Aoki et al.

(10) Patent No.: US 7,734,614 B2
(45) Date of Patent: Jun. 8, 2010

(54) SEARCH APPARATUS, SEARCH PROGRAM, AND SEARCH METHOD

(75) Inventors: Kazuo Aoki, Kanagawa-ken (JP); Kazuhiro Aramaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 11/753,769

(22) Filed: May 25, 2007

(65) Prior Publication Data

US 2008/0059431 A1 Mar. 6, 2008

(30) Foreign Application Priority Data

Jun. 9, 2006 (JP) ............................. 2006-160477

(51) Int. Cl.
*G06F 7/00* (2006.01)
*G06F 17/30* (2006.01)
(52) U.S. Cl. ........................................ 707/711; 707/750
(58) Field of Classification Search ................... 706/13; 715/531; 707/4, 101, 5, 3
See application file for complete search history.

(56) References Cited

U.S. PATENT DOCUMENTS

| 5,062,143 | A | * | 10/1991 | Schmitt | 382/230 |
| 5,276,741 | A | * | 1/1994 | Aragon | 382/229 |
| 5,418,951 | A | * | 5/1995 | Damashek | 707/5 |
| 5,452,442 | A | * | 9/1995 | Kephart | 714/38 |
| 5,706,496 | A | * | 1/1998 | Noguchi et al. | 707/3 |
| 5,724,593 | A | * | 3/1998 | Hargrave et al. | 704/7 |
| 5,748,953 | A | * | 5/1998 | Mizutani et al. | 707/6 |

(Continued)

FOREIGN PATENT DOCUMENTS

JP 2000348059 12/2000

OTHER PUBLICATIONS

Ogawa Abstract of "Pseudo-Frequency Method: An Efficient Ranking Retrieval Method for Japanese Documents Using n-Gram Indexing." The Transactions of The Institute of Electronics, Information and Communication Engineers, Japan, vol. J83-D-I, No. 10, (Oct. 25, 2000), pp. 1043-1054.

*Primary Examiner*—James Trujillo
*Assistant Examiner*—Pavan Mamillapalli
(74) *Attorney, Agent, or Firm*—Jeffrey T. Holman (57) ABSTRACT

The search apparatus of the present invention searches for a document corresponding to a specified search term from among a plurality of documents, and includes a search term pair generation unit for generating at least one search term pair including a first search string with a length equal to the number of index characters and a second search string with a length equal to the number of index characters located at a position shifted by a predetermined number of offset characters relative to the first search string, which are included in the search term, a search unit for searching, for each search term pair, an index database for a document which has both of the first search string and the second search string as indexing terms, a calculation unit for calculating a score of each document on the basis of a frequency of occurrence of the first search string and the second search string of each search term pair included in each document, and a selection unit for selecting a document to be outputted as a search result from among the plurality of documents, on the basis of the respective scores of the plurality of documents.

10 Claims, 9 Drawing Sheets

U.S. PATENT DOCUMENTS

| | | | |
|---|---|---|---|
| 6,003,043 A * | 12/1999 | Hatakeyama et al. | 707/203 |
| 6,038,561 A * | 3/2000 | Snyder et al. | 707/6 |
| 6,167,398 A * | 12/2000 | Wyard et al. | 707/5 |
| 6,314,421 B1 * | 11/2001 | Sharnoff et al. | 707/5 |
| 6,473,754 B1 * | 10/2002 | Matsubayashi et al. | 707/5 |
| 6,594,658 B2 * | 7/2003 | Woods | 707/5 |
| 6,901,402 B1 * | 5/2005 | Corston-Oliver et al. | 707/101 |
| 6,993,517 B2 * | 1/2006 | Naito et al. | 707/3 |
| 7,113,943 B2 * | 9/2006 | Bradford et al. | 707/4 |
| 2003/0126561 A1 * | 7/2003 | Woehler et al. | 715/531 |

* cited by examiner

FIG. 1

| INDEXING TERM | NUMBER OF DOCUMENTS | DOCUMENT | FREQUENCY | POSITION OF INDEXING TERM | PARTIAL SCORE (TFIDF) |
|---|---|---|---|---|---|
| AA | 2 | D1 | 1 | 1 | n1 |
|  |  | D2 | 2 | 1.7 | n2 |
| AB | 1 | D1 | 1 | 2 | n3 |
| AC | 1 | D1 | 2 | 3.9 | n4 |
| ... | ... | ... | ... | ... | ... |
| RA | 1 | D3 | 1 | 1 | nn |
| RB | 2 | D4 | 2 | 3.5 | nn+1 |
|  |  | D5 | 2 | 7.9 | nn+2 |
| ... | ... | ... | ... | ... | ... |

SEARCH APPARATUS, SEARCH PROGRAM, AND SEARCH METHOD

FIELD OF THE INVENTION

The present invention relates to a search apparatus, a search program, and a search method. Particularly, the present invention relates to a search apparatus, a search program, and a search method, which use an index database having a character string with a predetermined number of characters as an indexing term of a document.

BACKGROUND ART

A search apparatus is known, which searches for a target document from among a plurality of documents stored on Web or in a server using an N-gram index database (for example, refer to Yasushi Ogawa, "Pseudo-frequency method: a high-speed ranking search method for Japanese documents for n-gram indexing", Institute of Electronics, Information and Communication Engineers Paper Magazine, Institute of Electronics, Information and Communication Engineers, October, 2000, Vol. J83-D-I, No. 10, pp. 1043-1054). The N-gram index database has a plurality of character strings that are combinations of N (an integer that is equals to or more than two) characters as indexing terms, and stores, for each of the indexing terms, a document including that indexing term. The search apparatus divides a search term into search strings each having the same number of characters as the indexing term, and, for each of the search strings, searches for a document including that search string using the N-gram index database. According to the search apparatus using such an N-gram index database, a similar word which fails in a exact match with the search term (for example, a character string differing from the search term by a single character) can also be retrieved, and therefore, omission in the search can be reduced.

Incidentally, when a search term includes a term constituting another word, the search apparatus using the N-gram indexing outputs a search result containing much noise. In addition, if the number of characters N of the indexing term is increased, the search apparatus using the N-gram index can improve a relevance factor of the search result, but patterns of the indexing term will be N-th power of available character types to be explosively increased, resulting in decrease in efficiency.

SUMMARY OF THE INVENTION

Therefore, it is an object of the present invention to provide a search apparatus, a search program product, and a search method, which can solve the above-mentioned problems. The object will be achieved by combinations of features described in independent claims in the appended claims. The dependent claims define further advantageous embodiments of the present invention.

In order to solve the aforementioned problems, according to a first aspect of the present invention, there are provided: a search apparatus for searching for a document corresponding to a specified search term from among a plurality of documents, which includes an indexing term storage unit for storing an index database having a plurality of character strings each of which is composed of successive characters in each of a plurality of documents with a length equal to a predetermined number of index characters, and is used as an indexing term for that document, a search term pair generation unit for generating at least one search term pair including a first search string with a length equal to the number of index characters and a second search string with a length equal to the number of index characters located at a position shifted by a predetermined number of offset characters relative to the first search string, which are included in the search term, a search unit for searching the index database for a document having both of the first search string and the second search string as indexing terms, for each of the search term pairs, a calculation unit for calculating a score indicating a degree at which each document is included in a search result on the basis of a frequency of occurrence of the first search string and the second search string of each of the search term pairs included in each document or of whether or not the first search string and the second search string are included in each document, a selection unit for selecting a document to be outputted as the search result from among the plurality of documents, on the basis of the respective scores of the plurality of documents, and an output unit for outputting the document selected by the selection unit as the search result; a search program for causing an information processing apparatus to function as the search apparatus; and a search method for searching the document by the search apparatus.

According to a second aspect of the present invention, there are provided: a search apparatus for searching for a document corresponding to a specified search term from among a plurality of documents, which includes an indexing term storage unit for storing an index database having a plurality of character strings each of which is composed of successive characters in each of a plurality of documents with a length equal to a predetermined number of index characters, and is used as an indexing term for that document, a generation unit for generating at least one search string with a length equal to the number of index characters, the search string being included in the search term, a partial search unit for searching the index database for a document which has each of the search strings as an indexing term, a calculation unit for calculating a score indicating a degree at which each document is included in a search result, on the basis of a frequency of occurrence of each of the search strings included in each document or of whether or not each of the search strings is included in each document, a threshold generation unit for generating a threshold of the score which becomes larger as the search term becomes longer, and which becomes smaller as the search term becomes shorter, a selection unit for selecting a document having the score higher than the threshold as a document to be outputted as the search result, from among the plurality of documents, and an output unit for outputting the document selected by the selection unit; a search program for causing an information processing apparatus to function as the search apparatus, and a search method for searching the document by the search apparatus.

According to a third aspect of the present invention, there are provided: a search apparatus for searching for a document corresponding to a specified search term from among a plurality of documents, which includes an indexing term storage unit for storing an index database having a plurality of character strings each of which is composed of successive characters in each of a plurality of documents with a length equal to a predetermined number of index characters, and is used as an indexing term for that document, an exact match search unit for searching for a document including the search term from among the plurality of documents, a generation unit for generating at least one search string with a length equal to the number of index characters, the search string being included in the search term, a partial search unit for searching the index database for a document which has each of the search strings as an indexing term, a calculation unit for calculating a score indicating a degree at which each document is included in a search result, on the basis of a frequency of occurrence of each of the search strings included in each document or of whether or not each of the search strings is included in each document, a selection unit for selecting a document to be outputted as the search result from among the plurality of documents, on the basis of the respective scores of the plurality of documents, and an output unit for outputting the document searched by the exact match search unit as the search result on condition that the number of characters of the search term is less than a predetermined reference number of characters, and outputting the document searched by the exact match search unit and the document selected by the selection unit as the search result on condition that the number of characters of the search term is equal to or more than the reference number of characters; a search program for causing an information processing apparatus to function as the search apparatus; and a search method for searching the document by the search apparatus.

Note herein that, the above brief description of the invention does not list all the necessary features of the present invention, but sub-combinations of a group of these features can also constitute the invention.

According to the present invention, it is possible to efficiently perform a search with high relevance factor.

BEST MODE FOR CARRYING OUT THE INVENTION

While the present invention will be described below with respect to the embodiments of the invention, the embodiments below do not limit the invention as claimed in the appended claims, and not all the combinations of the features described in the embodiments are necessarily essential to the solving means of the invention.

Figure 1:
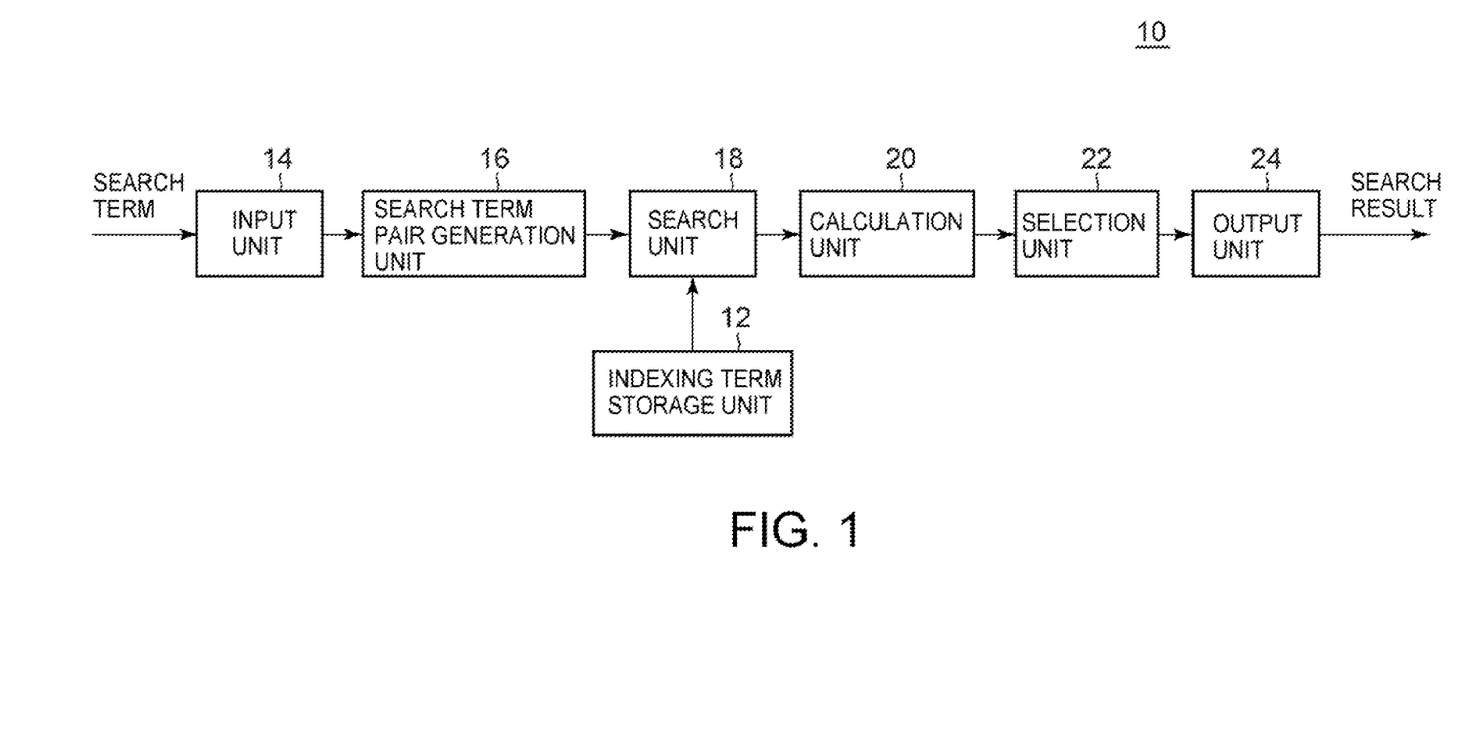
FIG. 1 illustrates a configuration of a search apparatus according to an embodiment of the present invention.

FIG. 1 illustrates a configuration of a search apparatus 10 in accordance with an embodiment. The search apparatus 10 searches for a document corresponding to a specified search term from among a plurality of documents. The search apparatus 10 is provided with an indexing term storage unit 12, an input unit 14, a search term pair generation unit 16, a search unit 18, a calculation unit 20, a selection unit 22, and an output unit 24.

The indexing term storage unit 12 stores an index database having a plurality of character strings each of which is composed of successive characters in each of a plurality of documents with a length equal to a predetermined number of index characters, and is used as an indexing term for that document. As one example, the indexing term storage unit 12 stores an index database having character strings each of which is composed of two successive characters and is used as an indexing term of the document. Alternatively, the indexing term storage unit 12 may use a character string composed of a different number of successive characters, such as three or four characters, as the indexing term. The indexing term storage unit 12 stores an index database obtained by analyzing a plurality of documents to be searched. When a new document is added as the one to be searched, the indexing term storage unit 12 reflects a result of having analyzed the new document in the index database.

The input unit 14 inputs a specified search term. As one example, when the search apparatus 10 is a search server, the input unit 14 may input a search term specified by a user through a terminal via a network or the like.

The search term pair generation unit 16 generates at least one search term pair containing a first search string with a length equal to the number of index characters and a second search string located at a position away from the first search string by a predetermined number of offset characters, with a length equal to the number of index characters, which are included in the search term. As one example, when the search term with four characters "ABCD" is inputted, the search term pair generation unit 16 may generate search term pairs (AB, BC) and (BC, CD) if the number of index characters is determined as 2 and the number of offset characters is determined as 1, and it may generate a search term pair (AB, CD) if the number of index characters is determined as 2 and the number of offset characters is determined as 2.

The search unit 18 searches for a document which has both of the first search string and the second search string as the indexing terms, from the index database for each of the search term pairs. As one example, the search unit 18 may search for a document including both of "AB" and "BC" for a search term pair whose first search string is "AB" and whose second search string is "BC" from the index database. In addition, if a plurality of search term pairs are inputted, the search unit 18 may search for a document including both of the first search string and the second search string for each search term pair.

The calculation unit 20 calculates a score indicating a degree at which each document is included in a search result, on the basis of a frequency of occurrence of the first search string and the second search string of each of the search term pairs included in each document or of whether or not the first search string and the second search string are included in each document. In the present embodiment, the search unit 18 calculates a score which becomes larger as relevancy between the document and search term becomes higher, on the basis of the frequency of occurrence of the search string included in the document. As one example, the calculation unit 20 may indicate a score of a document with the highest relevance to the search term as 100%, and indicate scores of other documents as relative values (100% to 0%) to the document with the highest relevance to the search term.

The selection unit 22 selects a document to be outputted as the search result from among a plurality of documents on the basis of the respective scores of the plurality of documents. The output unit 24 outputs the document selected by the selection unit 22 as the search result. As one example, when the search apparatus 10 is a search server, the output unit 24 may transmit the search result to the terminal via the network, or may transmit a page containing the search result to the terminal. In addition, when a computer apparatus is functioning as the search apparatus 10, the output unit 24 may display the search result on a screen.

Figure 2:
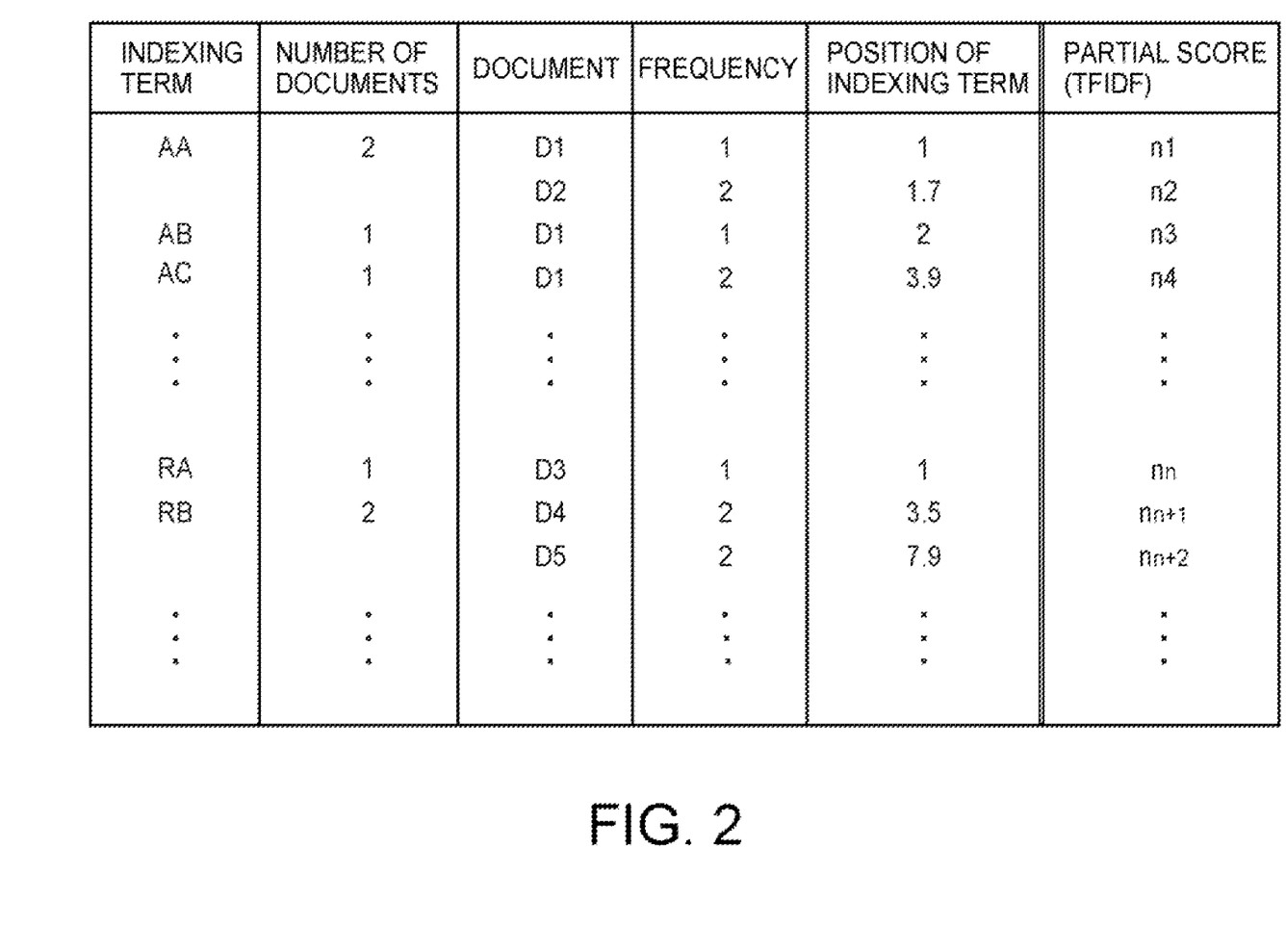
FIG. 2 illustrates an example of an index database stored in an indexing term storage unit of the search apparatus shown in FIG. 1.

FIG. 2 illustrates an example of the index database stored in the indexing term storage unit 12. As one example, the indexing term storage unit 12 may store the index database corresponding to the 2-gram indexing as illustrated in FIG. 2. The index database corresponding to the 2-gram indexing uses character strings composed by combining two characters as the indexing terms. As one example, the index database may use character strings including combinations of all characters in a language to be searched (for example, Japanese) as the indexing terms. Alternatively, as one example, the index database may use character strings included in any of the documents as the indexing terms and need not use character strings not included in any of the documents as the indexing terms.

As one example, the index database stores, in association with each of the indexing terms, the number of documents including that indexing term, a document including that indexing term, a frequency of that indexing term in each document including that indexing term, a position of that indexing term in each document, and a partial score corresponding to that indexing term for each document.

When there are a plurality of documents including a particular indexing term, the index database stores the plurality of documents for that one indexing term. In addition, when there are a plurality of documents including the same indexing term, the index database stores the frequency, the position, and the partial score in association with each document including that indexing term. Moreover, when the same indexing term appears in one document at different positions, the index database may store these positions of the indexing term in the document.

As one example, the index database may store the number of documents (for example, two) including an indexing term "AA", and documents including the indexing term "AA" (for example, document name D1, document name D2) in association with the indexing term "AA" as illustrated in FIG. 2. Additionally, the index database may store a frequency of the indexing term "AA" (for example, one time), a position of the indexing term "AA" in the document (the first character), and a partial score of the indexing term "AA" (for example, n1) in association with the first document (for example, document name D1) including the indexing term "AA", and may store the frequency of the indexing term "AA" (for example, two times), the position of the indexing term "AA" in the document (the first character, the seventh character), and the partial score of the indexing term "AA" (for example, n2) in association with the second document (for example, document name D2) including the indexing term "AA".

The partial score is a parameter which becomes larger as relevancy between the document and the indexing term is higher, and is calculated on the basis of a frequency of occurrence of the indexing term. As one example, the partial score may be a TFIDF value represented by the following Equation (1).

$$TFIDF(t,x)=tf(t,x) \times idf(t) \qquad (1)$$

In Equation (1), TFIDF(t,x) represents the TFIDF value of an indexing term t in a document x. In Equation (1), tf(t,x) is represented by the following Equation (2), and idf(t) is represented by the following Equation (3).

$$tf(t,x)=\log(1+OccNo(t,x)/\log(1+avg.OccNo(x)) \qquad (2)$$

$$idf(t)=\log(|D|/|Dt|) \qquad (3)$$

In Equation (2), OccNo(t,x) represents a frequency of occurrence of the indexing term t in the document x, and avg.OccNo(x) represents an average of frequencies of occurrence of the respective indexing terms included in the document x. In Equation (3), |D| represents the total number of documents to be searched. |Dt| represents the number of documents in which the indexing term t is included.

By representing the partial score using such a TFIDF value, the search apparatus 10 can turn the relevancy between the document and the indexing term into a value comparable with other indexing terms and other documents. The search unit 18 may calculate the partial score on the basis of the frequency of occurrence stored in the index database. Alternatively, the search unit 18 may read the partial score calculated in advance prior to the search from the index database.

Figure 3:
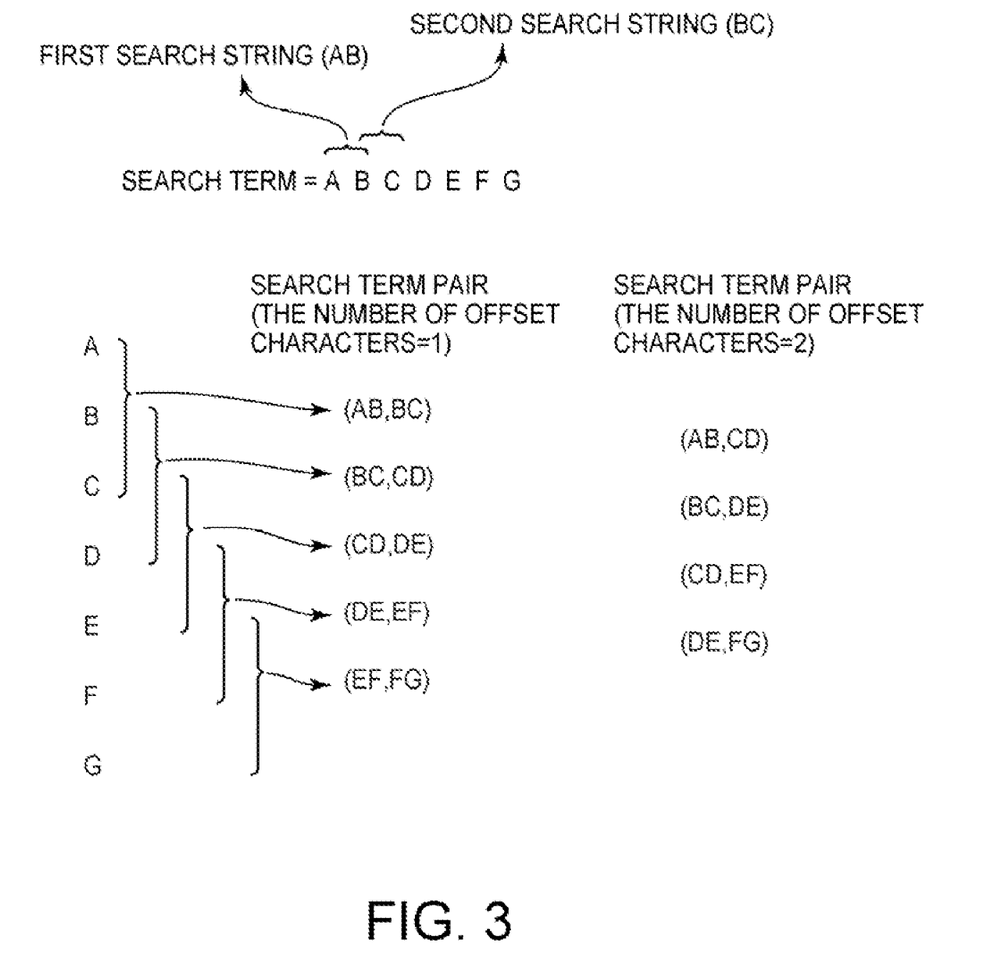
FIG. 3 illustrates an example of a search term and search term pairs.

FIG. 3 illustrates an example of the search term and the search term pair. As one example, the search term pair generation unit 16 may generate at least one search term pair composed of first and second search strings for the specified search term. When the indexing term is a character string with two successive characters, the search term pair generation unit 16 may generate a search term pair including a first search string with two characters included in the search term and a second search string with two characters located at a position shifted by one character relative to the first search string included in the search term (the number of offset characters=1), as one example. Also, the search term pair generation unit 16 may generate a search term pair including a first search string with two successive characters in the search term and a second search string with two characters located at a position shifted by two characters relative to the first search string included in the search term (the number of offset characters=2), as another example. Further, when the indexing term is a character string with two successive characters, the search term pair generation unit 16 may generate search term pairs in two patterns having the numbers of offset characters=1 and 2, respectively, for one search term, as a further example.

Moreover, the search term pair generation unit 16 may generate a plurality of search term pairs for one search term. In this case, the first search string included in each of the plurality of search term pairs is one character string among a plurality of character strings with the length equal to the number of index characters each of which is selected by shifting a position by one character starting from the head of the specified search term. In addition, in this case, the second search string is a character string with the length equal to the number of index characters and is in a position shifted by the predetermined number of offset characters relative to the corresponding first search string.

By using such a search term pair (the first search string and the second search string), according to the search apparatus 10, a relevancy factor which is a ratio for selecting a relevant document can be increased without increasing the length of the indexing term of the index database.

Figure 4:
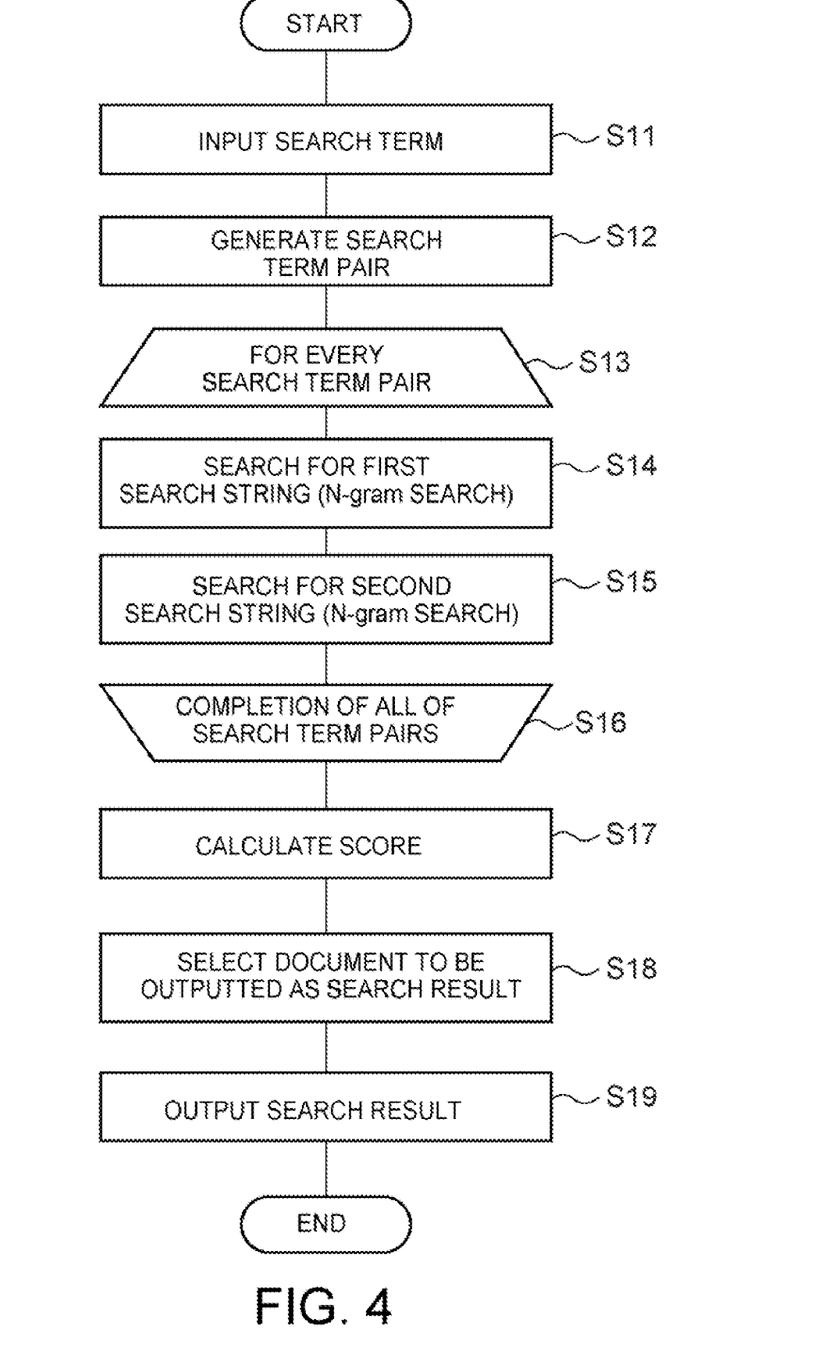
FIG. 4 illustrates a process flow of the search apparatus according to the embodiment.

FIG. 4 illustrates a process flow of the search apparatus 10 in accordance with the embodiment. First, the input unit 14 inputs a search term specified by the user or the like (S11). The input unit 14 may input the search term composed of, for example, a character string "ABCDEFG".

Next, the search term pair generation unit 16 generates at least one search term pair for the specified search term (S12). For example, when the input unit 14 inputs "ABCDEFG" as the search term, and the number of index characters is defined as 2 and the number of offset characters is defined as 2, the search term pair generation unit 16 may generate search term pairs (AB, CD), (BC, DE), (CD, EF), and (DE, FG).

Next, the search unit 18 performs a loop process of Steps S14 through S15 for every search term pair generated at S12 (S13, S16). When (AB, CD), (BC, DE), (CD, EF), and (DE, FG) are generated as the search term pairs, the search unit 18 performs the loop process of Steps S14 through S15 for each of (AB, CD), (BC, DE), (CD, EF), and (DE, FG) (S13, S16).

In this loop process, the search unit 18 searches for a document using the index database stored in the indexing term storage unit 12, taking the first search string of the search term pair as the indexing term (S14). Namely, the search unit 18 searches for a document including the first search string from among a plurality of documents. For example, if the search term pair is (AB, CD), the search unit 18 will search for a document including the first search string (AB).

Next, the search unit 18 searches for a document using the index database in the indexing term storage unit 12, taking the second search string of the search term pair as the indexing term (S15). Namely, the search unit 18 searches for a document including the second search string from among the plurality of documents. For example, if the search term pair is (AB, CD), the search unit 18 will search for a document including the second search string (CD). At Step S15, the search unit may extract a document on condition that the second search string is located at a position shifted by the number of offset characters relative to the first search string included in the document. For example, if the search term pair is (AB, CD), the search unit 18 may search for a document containing the character string "CD" successive to the character string "AB". This enables the search unit 18 to extract a document containing a character string extending from a first character of the first search string to a last character of the second search string.

Upon completion of the process at Steps S14 and S15 for each search term pair, the calculation unit 20 then calculates a score for each document on the basis of the frequency of occurrence of the first search string and the second search string of each of the search term pairs included in each of the documents or of whether or not the first search string and the second search string are included in each document (S17).

As one example, the calculation unit 20 may calculate, for each of the documents, a score of that document on the basis of partial scores corresponding to the first and second search strings of each of the search term pairs, respectively, at Step S17. As one example, the calculation unit 20 may calculate, for each of the documents, a score of that document on the basis of a smaller one of the partial scores corresponding to the first and second search strings of each of the search term pairs.

Assuming that (AB, CD), (BC, DE), (CD, EF), and (DE, FG) are generated as the search term pair and that the partial score of "AB" is $S_{AB}$; the partial score of "BC" is $S_{BC}$; the partial score of "CD" is $S_{CD}$; the partial score of "DE" is $S_{DE}$; the partial score of "EF" is $S_{EF}$; and the partial score of "FG" is $S_{FG}$, the search unit 18 may calculate a score S of each of the documents using the following Equation (4).

$$S = \min(S_{AB}, S_{CD}) + \min(S_{BC}, S_{DE}) + \min(S_{CD}, S_{EF}) + \min(S_{DE}, S_{FG}) \quad (4)$$

In Equation (4), "min (X, Y)" represents a smaller value of X and Y.

This enables the calculation unit 20 to calculate, for each of the documents, a score nearer to a score obtained when the document is searched by a character string extending from a first character of the first search string to a last character of the second search string. Alternatively, the calculation unit 20 may calculate the score of the document on the basis of an operation using the partial scores of the first and second search strings, such as an average value or a multiplication value of the partial scores corresponding to the first and second search strings, for each of the search term pairs.

Further, when a plurality of search term pairs are generated for one search term, the calculation unit 20 may use a value obtained by combining (for example, adding or averaging) a score calculated for each search term pair (for example, a smaller value of the partial scores obtained when the first search string serves as the indexing term and when the second search string serves as the indexing term, respectively) for each document as the score of that document at Step S17.

Next, the selection unit 22 selects a document to be outputted as the search result from among the plurality of documents on the basis of each score of the plurality of documents (S18). As one example, the selection unit 22 may rearrange the plurality of documents in the order from higher to lower scores to select a predetermined number of documents with higher scores from the top. Alternatively, the selection unit 22 may select each document with a score equal to or higher than a predetermined threshold.

Next, the output unit 24 outputs the document selected by the selection unit 22 as the search result (S19). As one example, the output unit 24 may output either the selected document or information for a user to acquire this document (for example, information indicating a storage area of the document).

As described above, according to the search apparatus 10, since the score of each document is calculated on the basis of the frequency of occurrence of the first search string and the second search string of the search term pair included in the document or of whether or not they are included in the document, the relevancy factor can be efficiently increased without increasing the number of characters of the indexing term in the index database.

Figure 5:
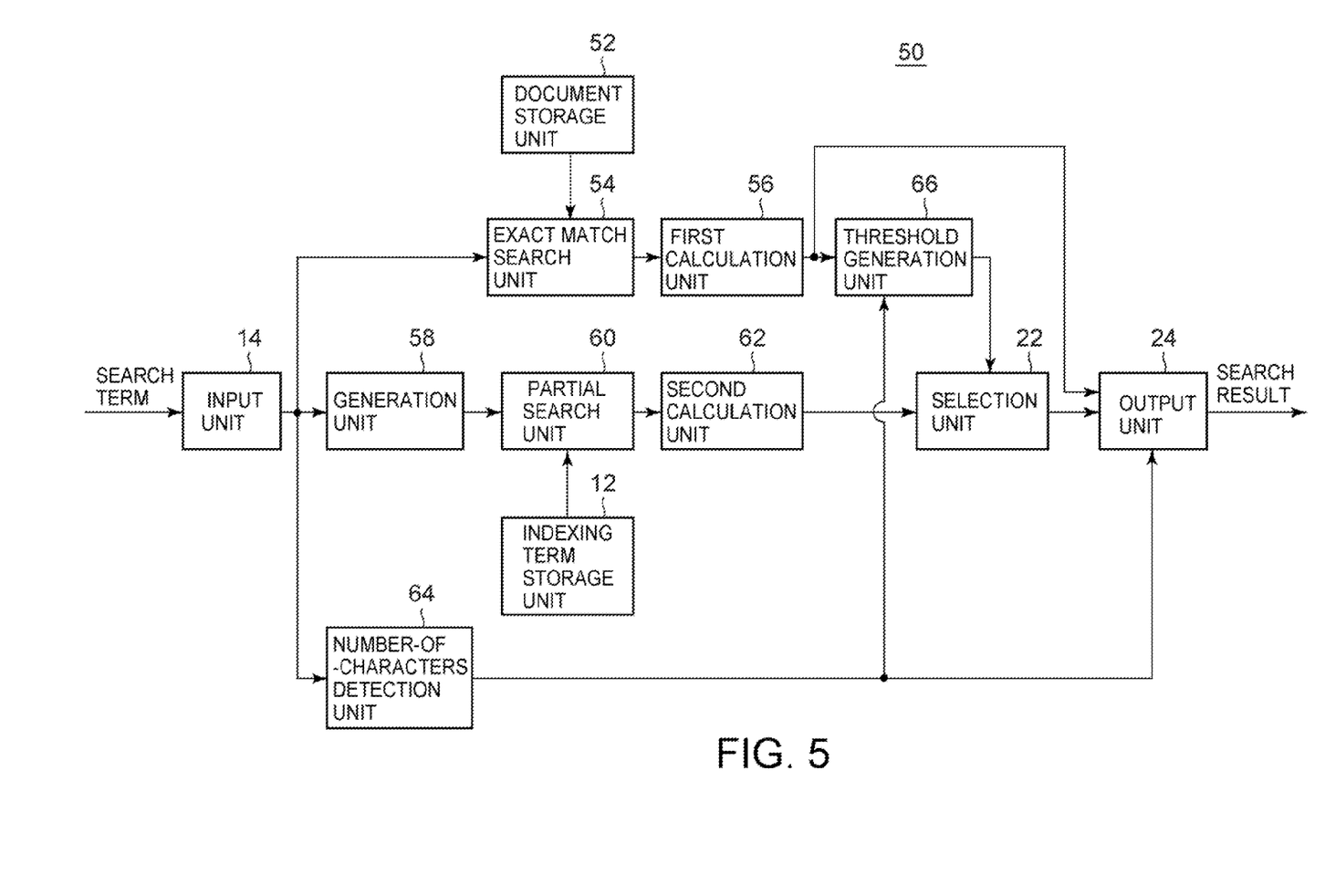
FIG. 5 illustrates a configuration of the search apparatus according to a modified embodiment of the present invention.

FIG. 5 illustrates a configuration of a search apparatus 50 in accordance with a modified embodiment. Since the search apparatus 50 illustrated in FIG. 5 employs functions and configuration almost the same as those of the search apparatus 10 illustrated in FIG. 1, the same symbols are given in the drawing to the components almost the same as those of the search apparatus 10 illustrated in FIG. 1, and description thereof will be omitted hereinafter except for differences.

The search apparatus 50 according to the modified embodiment is provided with the indexing term storage unit 12, the input unit 14, a document storage unit 52, an exact match search unit 54, a first calculation unit 56, a generation unit 58, a partial search unit 60, a second calculation unit 62, a number-of-characters detection unit 64, a threshold generation unit 66, the selection unit 22, and the output unit 24. Alternatively, the search apparatus 50 may be provided with the search term pair generation unit 16, the search unit 18, and the calculation unit 20 in place of the generation unit 58, the partial search unit 60, and the second calculation unit 62.

The document storage unit 52 stores an index database for searching a plurality of documents for a character string exactly matching with the specified search term. The index database stored in the document storage unit 52 may be used commonly with the index database stored in the indexing term storage unit 12. The exact match search unit 54 searches for a document including the specified search term from among the plurality of documents from the index database stored in the document storage unit 52. The first calculation unit 56 calculates, for each of the plurality of documents, a score of that document on the basis of a frequency of occurrence of the search term in each of the documents.

The generation unit 58 generates at least one search string with a length equal to the number of index characters, which is included in the search term. The partial search unit 60 searches for a document including each search string generated by the generation unit 58 as an indexing term, from the index database stored in the indexing term storage unit 12. Namely, the partial search unit 60 searches for a document including the search string from among the plurality of documents. The second calculation unit 62 calculates a score indicating a degree at which each document is included in the search result, on the basis of a frequency of occurrence of each of the search strings included in each of the documents or of whether or not each of the search strings is included in each document. The generation unit 58 may include the function of the search term pair generation unit 16 illustrated in FIG. 1, the partial search unit 60 may include the function of the search unit 18 illustrated in FIG. 1, and the second calculation unit 62 may include the function of the calculation unit 20 illustrated in FIG. 1.

The number-of-characters detection unit 64 detects the number of characters of the search term. The threshold generation unit 66 generates a threshold score which becomes larger as the search term becomes longer, and which becomes smaller as the search term becomes shorter, on the basis of the number of characters of the search term. As one example, the threshold generation unit 66 generates the threshold on the basis of the score generated by the first calculation unit 56.

The selection unit 22 selects a document having a score higher than the threshold generated by the threshold generation unit 66 from among the plurality of documents searched by the partial search unit 60 as the document to be outputted as the search result. The output unit 24 outputs the document searched by the exact match search unit 54 as the search result on condition that the number of characters of the search term is less than a predetermined reference number of characters, and outputs the document searched by the exact match search unit 54 and the document selected by the selection unit 22 as the search result on condition that the number of characters of the search term is equal to or more than the reference number of characters. Meanwhile, in case of, for example, a similar word in which a single character is inserted or replaced, fewer the number of characters is, more a ratio of a changed part thereof increases, resulting in decrease in the score thereof. Hence, the selection unit 22 can reduce the threshold when the number of characters of the search term is fewer, and thereby, improve the relevance factor that is a ratio for selecting a relevant document even when the number of characters of the search term is few. The generation unit 58, the partial search unit 60, and the second calculation unit 62 may generate the search string, perform the partial search, and calculate the score, respectively, on condition that the number of characters of the search term is equal to or more than the predetermined reference number of characters.

Figure 6:
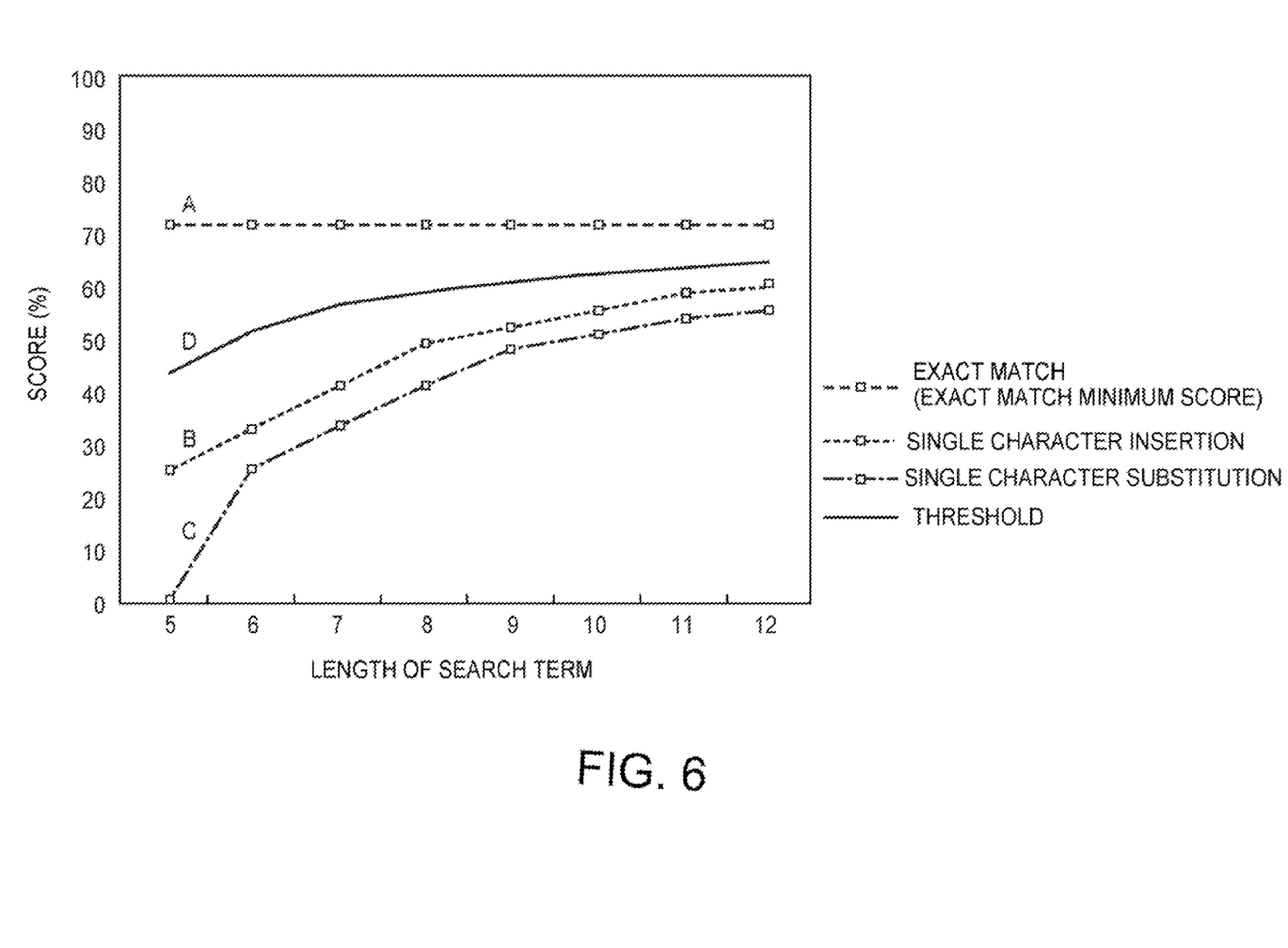
FIG. 6 illustrates an example of a graph showing document scores relative to search term lengths in a case where a plurality of Japanese documents are searched.

FIG. 6 illustrates an example of a graph showing document scores relative to search term lengths when a plurality of Japanese documents are searched. Symbol A in FIG. 6 represents an example of the lowest score among a group of scores of the documents including a character string exactly matched with the search term, relative to the length of the search term (number of characters). Symbol B in FIG. 6 represents an example of the lowest score among a group of scores of the documents including a character string in which a single character is inserted into the search term, relative to the length of the search term (the number of characters). Symbol C in FIG. 6 represents an example of the lowest score among a group of scores of the documents including a character string in which a single character in the search term is replaced, relative to the length of the search term (the number of characters). Symbol D in FIG. 6 represents an example of the threshold set by the threshold generation unit 66, relative to the length of the search term (the number of characters).

Among the group of scores of the documents including the character string exactly matched with the search term, the lowest score (exact match minimum score) will be approximately constant regardless of the length of the search term (number of characters). For that reason, the threshold generation unit 66 may generate the threshold on the basis of the scores of the documents including the search term calculated by the first calculation unit 56. This renders the selection unit 22 to appropriately set the threshold according to a relation between the search term and the plurality of documents to be searched, and therefore, this enables to reduce search omission and to improve the relevance factor.

In addition, among a group of scores of the documents including a character string in which a single character is inserted into the search term and a character string in which a single character in the search term is replaced, the lowest score (single character change minimum score) is lower than the exact match minimum score. For that reason, the threshold generation unit 66 may generate the threshold lower than the minimum value among the scores of all the documents including the search term. This enables the selection unit 22 to surely select a document including a character string exactly matching with the search term.

Further, since an occupation ratio of the inserted or replaced character is decreased as the search term becomes longer, the single character change minimum score approaches the exact match minimum score as the search term becomes longer. Namely, the single character change minimum score can be represented by a function such as a hyperbolic function, which uses a linear expression of the length of the search term as a denominator and gradually increases toward the exact match minimum score as the length of the search term becomes longer. As a result of this, the threshold generation unit 66 may generate the threshold using a function which includes a linear expression of the length of the search term as a denominator and gradually increases toward the minimum value as the length of the search term becomes longer. This enables the threshold generation unit 66 to select the document based on the appropriate threshold corresponding to the length of the search term, so that the search omission can be reduced and the relevance factor can be improved.

In addition, the single character change minimum score becomes remarkably low when the search term is extremely short. For example, the lowest score (symbol C in FIG. 6) among a group of scores of the documents including a character string in which a single character is replaced, is remarkably decreased in a case where the search term has five characters as compared with a case where the search term has six characters, and further, the score can not be calculated in a case where the search term has four characters or less. As a result of this, when the search term is extremely short, the partial search unit 60 outputs a search result containing much noise.

For that reason, the output unit 24 may set the reference number of characters to a value between four and six inclusive, more preferably to five. The output unit 24 then outputs the document searched by the exact match search unit 54 as the search result on condition that the number of characters of the search term is less than four, five, or six (preferably five), and outputs the document searched by the exact match search unit 54 and the document selected by the selection unit 22 as the search result on condition that the number of characters of the search term is equal to or more than four, five or six (preferably five). This enables the output unit 24 to improve the relevance factor in a case where the number of characters of the search term is three, four, or five.

As one example, the threshold generation unit 66 may generate a threshold T according to the following Equation (5).

$$T = S_L - (S_L \times K / (K \times (W-5))) \quad (5)$$

(Note that the length of the search term is more than five characters.)

$S_L$=lowest score among a group of scores of the documents including a character string exactly matched with the search term W=length of the search term K=coefficient (for example, 2).

Figure 7:
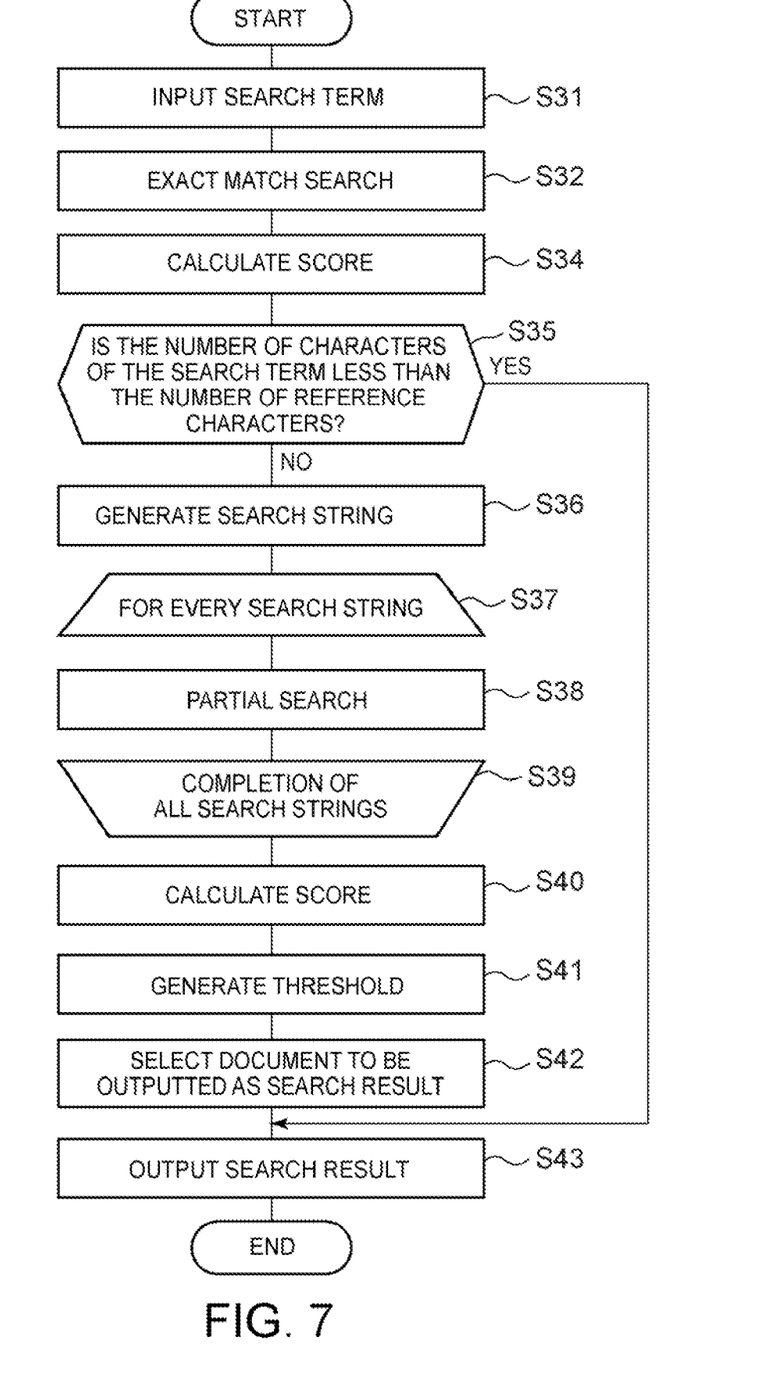
FIG. 7 illustrates a process flow of the search apparatus according to the modified embodiment.

FIG. 7 illustrates a process flow of the search apparatus 50 according to the modified embodiment. First, the input unit 14 inputs a search term specified by a user or the like (S31). Next, the exact match search unit 54 searches for a document including the search term from among a plurality of documents using the index database stored in the document storage unit 52 (S32). In this case, the exact match search unit 54 may search for the document including the search term using the index database stored in the indexing term storage unit 12. Next, the first calculation unit 56 calculates, for each of the documents searched by the exact match search unit 54, a score of that document (S34).

Next, the number-of-characters detection unit 64 determines whether or not the number of characters of the search term is less than the predetermined reference number of characters (S35). The number-of-characters detection unit 64 moves the process to Step S43 if the number of characters of the search term is less than the reference number of characters, while it moves the process to Step S36 if the number of characters of the search term is equal to or more than the reference number of characters.

Next, the generation unit 58 generates at least one search string with a length equal to the number of index characters, which is included in the search term (S36). Next, the partial search unit 60 performs the process of Step S38 for every search string generated at Step S36 (S37, S39). At Step S38, the partial search unit 60 searches for a document which has each of the search strings as the indexing term, from the index database stored in the indexing term storage unit 12. Namely, the partial search unit 60 searches for a document including the search string from among a plurality of documents.

Upon completion of the process at Step S38 for each search string, the second calculation unit 62 then calculates a score indicating a degree at which each of the documents is included in the search result, on the basis of the frequency of occurrence of each of the search strings included in each of the documents or of whether or not each of the search strings is included in each of the documents (S40). The search apparatus 50 may performs the process of Steps S12 through S17 illustrated in FIG. 4 in place of the process of Steps S36 through S40.

Next, the threshold generation unit 66 generates the threshold on the basis of the number of characters of the search term (S41). Next, the selection unit 22 selects a document having a larger score than the threshold from among the plurality of documents searched by the partial search unit 60 as the document to be outputted as the search result (S42). Next, the output unit 24 outputs the document searched by the exact match search unit 54 as the search result on condition that the number of characters of the search term is less than the reference number of characters, and outputs the document searched by the exact match search unit 54 and the document selected by the selection unit 22 as the search result on condition that the number of characters of the search term is equal to or more than the reference number of characters (S43).

According to the search apparatus 50 for performing the above-mentioned process, since the apparatus 50 selects documents while adaptively changing the threshold depending on the number of characters, the search omission can be reduced and the relevance factor can be improved. Moreover, when the number of characters of the search term is short, the search apparatus 50 outputs the search result based on the exact match search, so that the relevance factor can be further improved.

Figure 8:
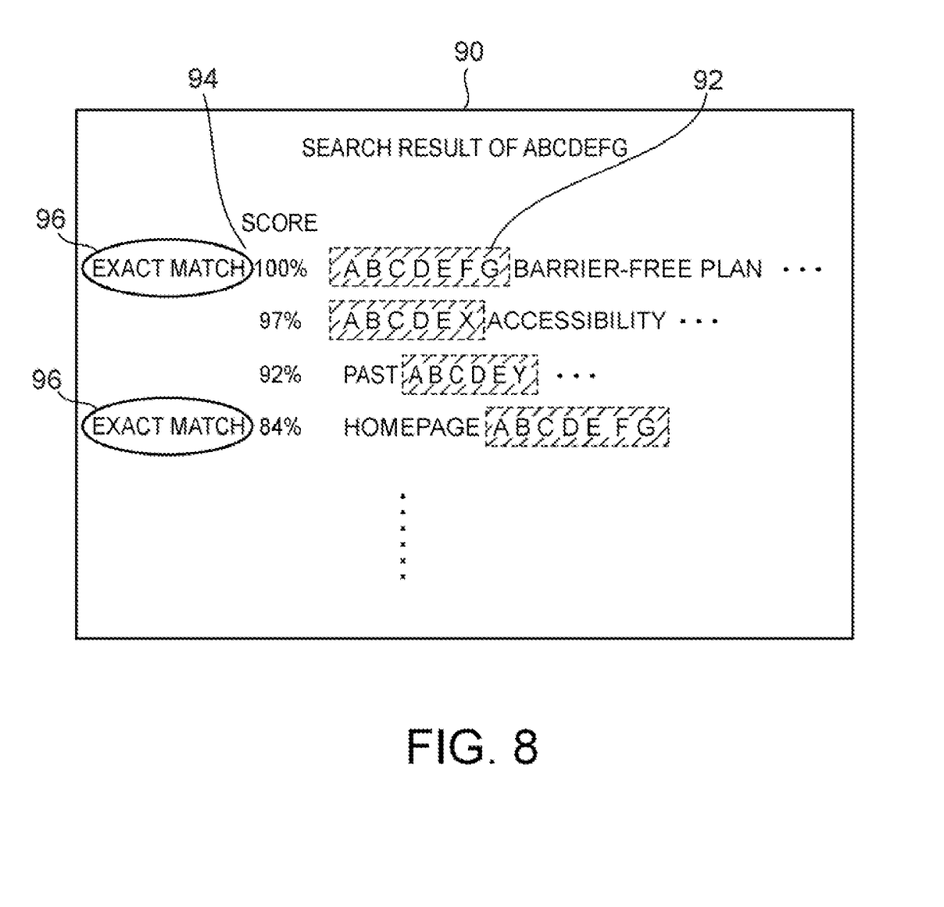
FIG. 8 illustrates a display example of a search result.

FIG. 8 illustrates a display example of the search result. As one example, the output unit 24 may output the documents searched by the exact match search unit 54 and the documents selected by the selection unit 22 in order of score from the highest. When a display screen 90 is displayed on a display unit, the output unit 24 may display summaries 92 and scores 94 of the selected documents in order of score from the highest.

In addition, the output unit 24 may output the documents searched by the exact match search unit 54 and the documents selected by the selection unit 22, so that a user of the search apparatus 50 can identify the documents. When displaying the display screen 90 on the display unit, the output unit 24 may display an exact match identification 96 which indicates whether or not the document has been searched by the exact match search unit 54 (namely, whether or not the document is the one including the character string matched with the search term), together with the summary 92. This enables the search apparatus 50 to provide the user with the information of whether or not the document is the one including the character string exactly matched with the search term.

Figure 9:
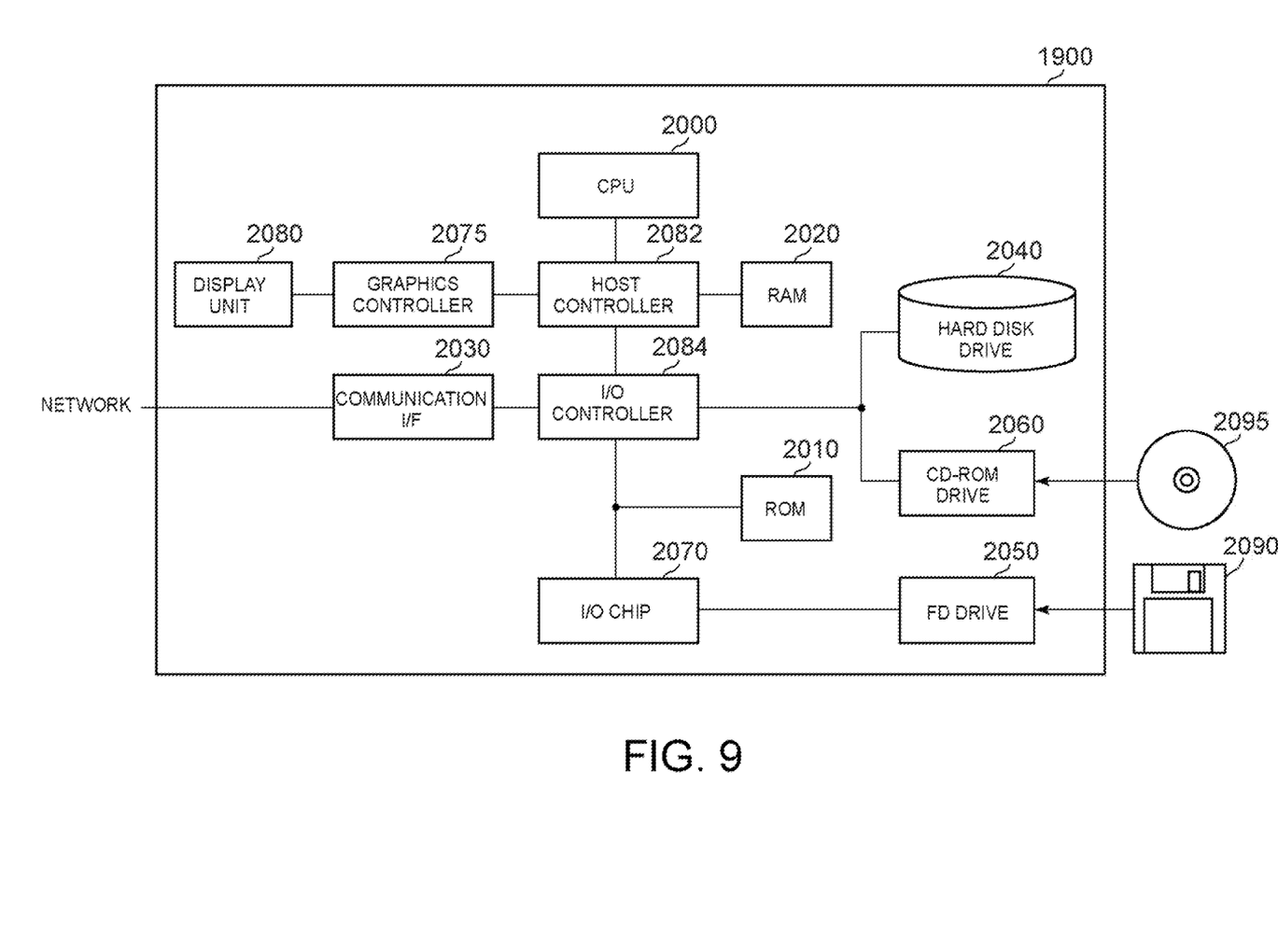
FIG. 9 illustrates an example of a hardware configuration of a computer according to the embodiment of the present invention.

FIG. 9 illustrates an example of a hardware configuration of a computer 1900 according to the present embodiment. The computer 1900 is provided with a CPU-related part having a CPU 2000, a RAM 2020, a graphics controller 2075, and a display unit 2080, which are interconnected by a host controller 2082, an I/O part having a communication interface 2030, a hard disk drive 2040, and a CD-ROM drive 2060, which are connected to the host controller 2082 via an I/O controller 2084, and a legacy I/O part having a ROM 2010, a flexible disk drive 2050, and an I/O chip 2070, which are connected to the I/O controller 2084.

The host controller 2082 connects the RAM 2020 with the CPU 2000 and the graphics controller 2075, which access the RAM 2020 at a high transfer rate. The CPU 2000 operates based on programs stored in the ROM 2010 and the RAM 2020, and controls each part. The graphics controller 2075 acquires image data generated by the CPU 2000 or the like on a frame buffer which is provided in the RAM 2020, and displays the same on the display 2080. Alternatively, the graphics controller 2075 may therein include the frame buffer which stores the image data generated by the CPU 2000 or the like.

The I/O controller 2084 connects the host controller 2082 with the communication interface 2030, the hard disk drive 2040, and the CD-ROM drive 2060, which are relatively high-speed I/O devices. The communication interface 2030 communicates with other devices via the network. The hard disk drive 2040 stores programs and data used by the CPU 2000 in the computer 1900. The CD-ROM drive 2060 reads a program or data from the CD-ROM 2095, and provides the same to the hard disk drive 2040 or the RAM 2020.

To the I/O controller 2084, the ROM 2010, and relatively low-speed I/O devices such as the flexible disk drive 2050 and the I/O chip 2070 are connected. The ROM 2010 stores a boot program to be executed by the computer 1900 on starting up, programs depending on hardware of the computer 1900, and other programs. The flexible disk drive 2050 reads a program or data from a flexible disk 2090, and provides the same to the hard disk drive 2040 or the RAM 2020. The I/O chip 2070 connects the flexible disk drive 2050 and various types of I/O devices via, for example, a parallel port, a serial port, a keyboard port, a mouse port, etc.

The program provided to the hard disk drive 2040 is stored in a recording medium, such as the flexible disk 2090, the CD-ROM 2095, or an IC card, and is provided by a user. The program is read from the recording medium, installed in the hard disk drive 2040 in the computer 1900, and executed by the CPU 2000.

The program which is installed in the computer 1900 and causes the computer 1900 to function as the search apparatus 10 includes an indexing term storage module, an input module, a search term pair generation module, a search module, a calculation module, a selection module, and an output module. These programs or modules work on the CPU 2000 and other devices to cause the computer 1900 to function as the indexing term storage unit 12, the input unit 14, the search term pair generation unit 16, the search unit 18, the calculation unit 20, the selection unit 22, and the output unit 24, respectively.

Also, the program which is installed in the computer 1900 and causes the computer 1900 to function as the search apparatus 50 according to the modified embodiment includes an indexing term storage module, an input module, a document storage module, an exact match search module, a first calculation module, a generation module, a partial search module, a second calculation module, a number-of-characters detection module, a threshold generation module, a selection module, and an output module. These programs or modules work on the CPU 2000 and other devices to cause the computer 1900 to function as the indexing term storage unit 12, the input unit 14, the document storage unit 52, the exact match search unit 54, the first calculation unit 56, the generation unit 58, the partial search unit 60, the second calculation unit 62, the number-of-characters detection unit 64, the threshold generation unit 66, the selection unit 22, and the output unit 24, respectively.

The programs or modules illustrated above may be stored in an external storage medium. As the storage medium, in addition to the flexible disk 2090 and the CD-ROM 2095, it is possible to use an optical recording medium, such as a DVD or a CD, an optical magnetic recording medium, such as an MO, a tape medium, and a semiconductor memory, such as an IC card. In addition, it is also possible to use a storage unit, such as a hard disk or a RAM, which is provided in a server system connected to a dedicated communication network or the Internet, as a recording medium, and to provide the computer 1900 with the program via the network.

While the present invention has been described using the embodiments, the technical scope of the present invention is not limited to the scope described in the above embodiments. It is obvious to those skilled in the art that various types of modifications or improvements may be added to the aforementioned embodiments. It is clear from the appended claims that such modified or improved embodiments can also be included in the technical scope of the present invention.

What is claimed is:

1. A search apparatus for searching for a document corresponding to a specified search term from among a plurality of documents, the search apparatus comprising:
    an indexing term storage unit for storing an index database having a plurality of character strings each of which is composed of successive characters in each of a plurality of documents with a length equal to a predetermined number of index characters, and is used as an indexing term for that document;
    a search term pair generation unit for generating at least one search term pair including a first search string with a length equal to the number of index characters and a second search string with a length equal to the number of index characters located at a position shifted by a predetermined number of offset characters relative to the first search string, which are included in the search term;
    a search unit for searching the index database for a document having both of the first search string and the second search string as indexing terms, for each of the search term pairs;
    a calculation unit for calculating a score indicating a degree at which each document is included in a search result on the basis of a frequency of occurrence of the first search string and the second search string of each of the search term pairs included in each document or of whether or not the first search string and the second search string are included in each document;
    a selection unit for selecting a document to be outputted as the search result from among the plurality of documents, on the basis of the respective scores of the plurality of documents; and
    an output unit for outputting the document selected by the selection unit as the search result.

2. The search apparatus according to claim 1, wherein the indexing term storage unit stores, in association with each of the indexing terms, each document including that indexing term and a partial score corresponding to that indexing term in each document in the index database, and the calculation unit calculates, for each document, the score of that document on the basis of the partial scores corresponding to the first search string and the second search string of each of the search term pairs.

3. The search apparatus according to claim 2, wherein the calculation unit calculates the score of the document on the basis of a smaller one of the partial scores corresponding to the first search string and the second search string for each of the search term pairs.

4. The search apparatus according to claim 1, wherein the indexing term storage unit stores, in association with to each of the indexing terms, each document including that indexing term and a position of that indexing term in each document in the index database, and the search unit extracts a document for the search term pair, on condition that the second search string is included at a position shifted by the number of offset characters relative to the first search string included in the document.

5. A search apparatus for searching for a document corresponding to a specified search term from among a plurality of documents, the search apparatus comprising:
    an indexing term storage unit for storing an index database having a plurality of character strings each of which is composed of successive characters in each of a plurality of documents with a length equal to a predetermined number of index characters, and is used as an indexing term for that document;
    a generation unit for generating at least one search string with a length equal to the number of index characters, the search string being included in the search term;
    a partial search unit for searching the index database for a document which has each of the search strings as an indexing term;
    a calculation unit for calculating a score indicating a degree at which each document is included in a search result, on the basis of a frequency of occurrence of each of the search strings included in each document or of whether or not each of the search strings is included in each document;

a threshold generation unit for generating a threshold of the score which becomes larger as the search term becomes longer, and which becomes smaller as the search term becomes shorter;

a selection unit for selecting a document having the score higher than the threshold as a document to be outputted as the search result, from among the plurality of documents; and an output unit for outfitting the document selected by the selection unit.

6. The search apparatus according to claim 5, further comprising an exact match search unit for searching for a document including the search term from among the plurality of documents, wherein the calculation unit further calculates the score of the document, on the basis of a frequency of occurrence of the search term included in the document, and the threshold generation unit generates the threshold on the basis of the score of the document including the search term.

7. The search apparatus according to claim 6, wherein the threshold generation unit generates the threshold smaller than a minimum value of the scores of all the documents including the search term.

8. The search apparatus according to claim 7, wherein the threshold generation unit generates the threshold using a function which includes a linear expression of the length of the search term as a denominator and gradually increases toward the minimum value as the length of the search term becomes longer.

9. A search program for searching for a document corresponding to a specified search term from among a plurality of documents by a computer, the search program causing the computer to function as:

an indexing term storage unit for storing an index database having a plurality of character strings each of which is composed of successive characters in each of a plurality of documents with a length equal to a predetermined number of index characters, and is used as an indexing term for that document;

a search term pair generation unit for generating at least one search term pair including a first search string with a length equal to the number of index characters and a second search string with a length equal to the number of index characters located at a position shifted by a predetermined number of offset characters relative to the first search string, which are included in the search term;

a search unit for searching the index database for a document having both of the first search string and the second search string as indexing terms, for each of the search term pairs;

a calculation unit for calculating a score indicating a degree at which each document is included in a search result on the basis of a frequency of occurrence of the first search string and the second search string of each of the search term pairs included in each document or of whether or not the first search string and the second search string are included in each document;

a selection unit for selecting a document to be outputted as the search result from among the plurality of documents, on the basis of the respective scores of the plurality of documents; and an output unit for outputting the document selected by the selection unit as the search result.

10. A search method for searching for a document corresponding to a specified search term from among a plurality of documents by a computer, wherein the computer stores an index database having a plurality of character strings each of which is composed of successive characters in each of a plurality of documents with a length equal to a predetermined number of index characters, and is used as an indexing term for that document, the method comprising:

a search term pair generation step of generating, by the computer, at least one search term pair including a first search string with a length equal to the number of index characters and a second search string with a length equal to the number of index characters located at a position shifted by a predetermined number of offset characters relative to the first search string, which are included in the search term;

a search step of searching, by the computer, the index database for a document having both of the first search string and the second search string as indexing terms, for each of the search term pairs;

a calculation step of calculating, by the computer, a score indicating a degree at which each document is included in a search result on the basis of a frequency of occurrence of the first search string and the second search string of each of the search term pairs included in each document or of whether or not the first search string and the second search string are included in each document;

a selection step of selecting, by the computer, a document to be outputted as the search result, on the basis of the respective scores of the plurality of documents; and an output step of outputting the document selected by the selection step.

* * * * *